US008169972B2

(12) United States Patent
Chiu et al.

(10) Patent No.: US 8,169,972 B2
(45) Date of Patent: May 1, 2012

(54) SYSTEM AND METHOD FOR PROVIDING SERVICE CONTINUITY OF MULTICAST AND BROADCAST SERVICES IN A WIRELESS COMMUNICATION SYSTEM

(75) Inventors: Chun-Yuan Chiu, Pingtung (TW); Chun-Yen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 432 days.

(21) Appl. No.: 12/553,422

(22) Filed: Sep. 3, 2009

(65) Prior Publication Data

US 2010/0067490 A1   Mar. 18, 2010

Related U.S. Application Data

(60) Provisional application No. 61/096,751, filed on Sep. 12, 2008.

(51) Int. Cl.
*H04W 4/00* (2009.01)
(52) U.S. Cl. ........................ 370/331; 455/338; 455/339
(58) Field of Classification Search ........................ None
See application file for complete search history.

(56) References Cited

U.S. PATENT DOCUMENTS

| 7,065,362 | B2 * | 6/2006 | Lee et al. | 455/442 |
| 2008/0273503 | A1 | 11/2008 | Lee et al. | |
| 2008/0287129 | A1 | 11/2008 | Somasundaram et al. | |
| 2009/0061876 | A1 * | 3/2009 | Ho et al. | 455/436 |
| 2009/0312021 | A1 * | 12/2009 | Kim | 455/436 |
| 2010/0069071 | A1 * | 3/2010 | Simonsson et al. | 455/436 |
| 2010/0091734 | A1 * | 4/2010 | Park et al. | 370/331 |

OTHER PUBLICATIONS

Yanover, Vladimir, et al., "Improvement in MBS in 802.16REV2", IEEE 802.16 Broadband Wireless Access Working Group, IEEE C802.16maint-08/171r8, May 15, 2008.

* cited by examiner

*Primary Examiner* — Bob Phunkulh
(74) *Attorney, Agent, or Firm* — Finnegan, Henderson, Farabow, Garrett & Dunner, LLP

(57) ABSTRACT

There is provided a method of handing over a provided service from a serving base station to a target base station, the service including streaming content sent to a mobile station. The method includes receiving, at the target base station, a handover request from the serving base station, the handover request identifying the streaming content being provided to the mobile station by the serving base station, and an interrupt data packet, of the streaming content, last transmitted to the mobile station. The method includes sending a handover response to the serving base station and receiving a notification from the serving base station indicating that the target base station is selected for handover. The method includes receiving, from the serving base station, subsequent data packets of the streaming content that are later in time than the interrupt data packet and sending the received subsequent data packets to the mobile station.

24 Claims, 9 Drawing Sheets

SYSTEM AND METHOD FOR PROVIDING SERVICE CONTINUITY OF MULTICAST AND BROADCAST SERVICES IN A WIRELESS COMMUNICATION SYSTEM

RELATED APPLICATION

This application claims priority from Provisional Application No. 61/096,751 filed Sep. 12, 2008, the entire contents of which are hereby incorporated by reference.

FIELD OF THE DISCLOSURE

This disclosure relates to methods and systems for handing over a provided service from a serving base station to a target base station, the service including streaming content sent to a mobile station.

BACKGROUND

Wireless communication networks enable mobile stations, such as cellular phones, personal digital assistants, and laptop computers, to receive voice and data services. The increased use of the mobile stations has resulted in an increased demand for high-speed, flexible, and reliable wireless communication networks.

Mobile stations operate in either a connected state or an idle state. In the connected state, the mobile station synchronizes with the base station in order to establish a connection with the base station. The base station then communicates with the mobile station over the established connection. However, to conserve battery power, the mobile station may enter into an idle state, in which the mobile station does not establish a connection with a base station.

Moreover, conventional wireless communication networks use unicast transmissions, in which a single base station transmits data to a single mobile station. In order for the mobile station to receive the transmitted data, it must be in the connected state with the base station. Thus, when using unicast transmission, the mobile station cannot receive the transmitted data if it is operating in an idle state.

By contrast, multicast and broadcast services (MBS) enable base station(s) to transmit data to multiple mobile stations at a time, over a coverage area of the base station(s). When using MBS, the mobile station can receive data in both the connected state and in the idle state.

In MBS, the mobile station receives data from a serving base station. In some instances, the mobile station may move out of a coverage area of the serving base station and into a coverage area of a target base station. The mobile station may receive a stronger signal from the target base station, and thus, may need to receive the data from the target base station instead of the serving base station. In this way, the serving base station and the target base station are both base stations that the mobile device interacts with during a handover of service.

The move from the serving base station to the target base station may occur while the mobile station is receiving a service from the serving base station, such as a television program, music, or other streaming content, for example. Thus, the mobile station needs to receive the service from the target base station, at the point at which the received signal strength from the serving base station decreases below a predetermined threshold. To accomplish this, the serving base station "hands-over" the service to the target base station. Unlike unicast services, the handover for MBS can take place when the mobile station is in either a connected state or in an idle state. Moreover, it is desirable that continuity of service is maintained during the handover, so that there is not a gap in the content from the perspective of a user of the mobile station.

SUMMARY

In accordance with disclosed embodiments, there is provided a method of handing over a provided service from a serving base station to a target base station, the service including streaming content sent to a mobile station, the method comprising: receiving, at the target base station, a handover request from the serving base station, the handover request identifying the streaming content being provided to the mobile station by the serving base station, and an interrupt data packet, of the streaming content, last transmitted to the mobile station; sending a handover response to the serving base station; receiving a notification from the serving base station indicating that the target base station is selected for handover; receiving, from the serving base station, subsequent data packets of the streaming content that are later in time than the interrupt data packet; sending the received subsequent data packets to the mobile station.

In accordance with disclosed embodiments, there is further provided a target base station for receiving a handover of a service provided by a serving base station, the service including streaming content sent to a mobile station, the target base station comprising: a memory configured to store a handover request received from the serving base station, the handover request identifying the streaming content being provided to the mobile station by the serving base station, and an interrupt data packet, of the streaming content, last transmitted to the mobile station; a processor configured to generate a handover response to send to the serving base station; an input port configured to receive a notification from the serving base station indicating that the target base station is selected for handover, and receive, from the serving base station, subsequent data packets of the streaming content that are later in time than the interrupt data packet; and an output port configured to send the received subsequent data packets to the mobile station.

In accordance with disclosed embodiments, there is further provided a method of receiving a service during a handover of the service, the method comprising: receiving, at a mobile station, streaming content from a serving base station in a first format until an interrupt data packet of the streaming content; receiving a handover command from the serving base station, the handover command identifying a target base station and streaming services provided by the target base station; receiving subsequent data packets of the streaming content from the target base station in a second format, wherein the subsequent data packets of the streaming content are later in time than the interrupt data packet of the streaming content; and receiving streaming packets of the streaming content from the target base station in the first format after receiving the subsequent data packets, wherein the streaming packets of the streaming content are later in time than the subsequent data packets of the streaming content.

In accordance with disclosed embodiments, there is further provided a mobile station for receiving a service during a handover of the service, the mobile station comprising an input port configured to: receive streaming content from a serving base station in a first format until an interrupt data packet of the streaming content, and receive a handover command from the serving base station, the handover command identifying a target base station and streaming services provided by the target base station; and a memory configured to store subsequent data packets of the streaming content received from the target base station in a second format, wherein the subsequent data packets of the streaming content are later in time than the interrupt data packet of the streaming content, and store streaming packets of the streaming content received from the target base station in the first format, after receiving the subsequent data packets, wherein the streaming packets of the streaming content are later in time than the subsequent data packets of the streaming content.

Additional advantages of the disclosure will be set forth in part in the description which follows, and in part will be obvious from the description, or may be learned by practice of the invention. The advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain principles of the invention.

DESCRIPTION OF THE EMBODIMENTS

Reference will now be made in detail to exemplary embodiments which are illustrated in the accompanying drawings. Wherever possible, the same reference numbers will be used throughout the drawings to refer to the same or like parts.

Figure 1:
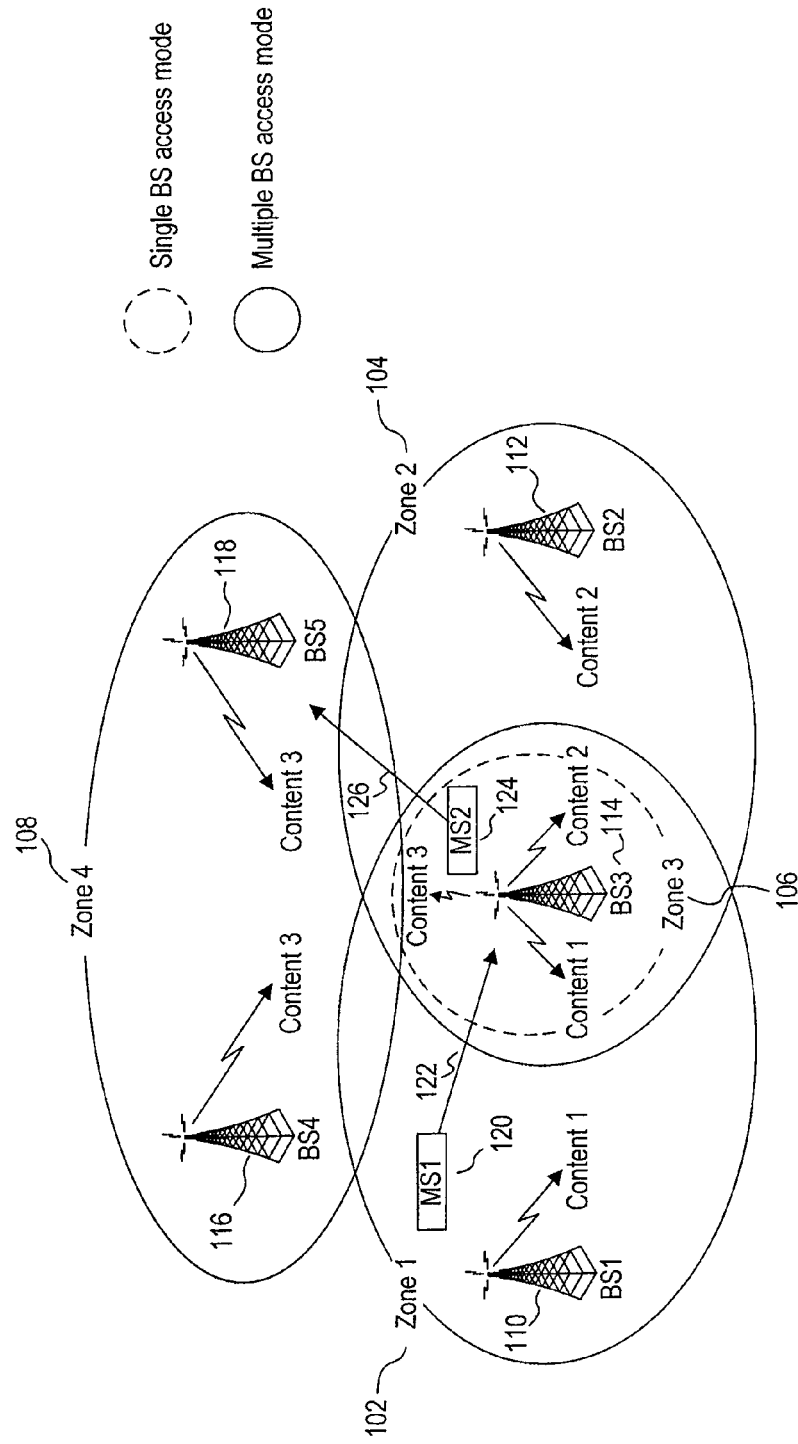
FIG. 1 is diagram illustrating mobile stations moving in a wireless communication network using multicast and broadcast services (MBS).

FIG. 1 is diagram illustrating mobile stations moving in an exemplary wireless communication network 100 using multicast and broadcast services (MBS). FIG. 1 includes a plurality of zones, each zone including a unique zone identifier, or zoneID. For example, wireless communication network 100 is assumed to include zone 1 102, zone 2 104, zone 3 106, and zone 4 108. The term zone as used herein, is a coverage area of one or more base stations. All base stations in a zone transmit the same content(s) with the same connection identifier(s) (CIDs). Zone 1, which provides content 1, includes base station (BS) 1 110 and BS3 114; zone 2, which provides content 2, includes BS2 112 and BS3 114; zone 3, which provides content 3, includes BS3 114; and zone 4, which also provides content 3, includes BS4 116 and BS5 118.

While some base stations may belong to only one zone, other base stations may belong to multiple zones. For example, BS1 110 belongs only to zone 1 102. However, BS3 114 belongs to zone 1 102, zone 2 104, and zone 3 106. Base stations also broadcast their corresponding zoneID(s). For example, BS1 110 broadcasts the zoneID for zone 1 102, over the coverage area of BS1 110. Also, BS3 114 broadcasts the zoneIDs of zone 1 102, zone 2 104, and zone 3 106 over the coverage area of BS3 114. As shown in FIG. 1, the coverage area of zone 3 106 overlaps with the coverage areas of zone 1 102 and zone 2 104.

Wireless communication network 100 is further assumed to include both single BS access mode and multiple BS access mode. Single BS access mode is implemented over multicast and broadcast transport connections by a single base station. Thus, in single BS access mode, only one base station provides content(s) to any number of mobile stations. In wireless communication network 100, zone 3 106 operates according to single BS access mode.

By contrast, multiple BS access mode is implemented by transmitting data, such as streaming content(s), from multiple base stations to any number of mobile stations. Multiple BS access mode is advantageous in that multiple base stations may transmit the same content(s), such that the mobile station receives redundant transmissions. Thus, if one of the transmissions is corrupted, the mobile station has the redundant transmission to use, or to correct the corrupted transmission. In wireless communication network 100, zone 1 102, zone 2 104, and zone 4 108 operate according to multiple BS access mode.

Zone 1 102 includes mobile station (MS) 1 120, which may be in either a connected state or an idle state while receiving content. While in zone 1 102, MS1 120 receives content 1, such as a television program, from BS1 110. It is assumed that, in FIG. 1, MS1 120 is moving closer to BS3 114, as indicated by arrow 122. MS1 120 may continuously measure a signal strength of broadcast channels (e.g., a pilot or a synchronization channel) from neighboring base stations, such as BS1 110 and BS3 114.

MS1 120 may be in either the connected state or the idle state. As MS1 120 moves closer to BS3 114, the signal strength of BS3 114 may increase above a predetermined threshold. MS1 120 may seek to perform cell reselection or handover in order to receive content 1 from BS3 114 instead of BS1 110. MS1 120 would perform the reselection if it were in the idle state, and would perform the handover if it were in the connected state.

Content 1 is associated with zone 1. Once MS1 120 becomes aware of zoneIDs associated with BS3 114, MS1 120 determines that BS3 114 also belongs to zone 1. Therefore no connection information (e.g., zoneID, CID, Modulation and Coding Scheme (MCS), scheduling information, etc.) needs updating when MS1 120 performs cell reselection or handover. In other words, MS1 120 performs cell reselection or handover with BS3 114, without updating its connection information, when the following criteria are met. First, MS1 120 calculates that the signal strength of BS3 114 is above a predetermined threshold. Second, MS1 120 determines that BS3 114 belongs to zone 1, which is the same zone from which MS1 120 is moving. In this way, MS1 120 performs cell reselection or handover with BS3 114 without updating its connection information.

Wireless communication network 100 also includes MS2 124 within zone 3 106, which may be in either a connected state or an idle state while receiving content. While in zone 3 106, MS2 124 receives content 3, such as a television program, from BS3 114. It is assumed that, in FIG. 1, MS2 124 is moving closer to BS5 118, as indicated by arrow 126. MS2 124 may continuously measure a signal strength of broadcast channels from neighboring base stations, such as BS3 114 and BS5 118.

As MS2 124 moves closer to BS5 118, the signal strength of BS5 118 may increase above a predetermined threshold. MS2 124 may seek to perform cell reselection or handover in order to receive content 3 from BS5 118 instead of BS3 114.

Content 3 is associated with zone 3. Once MS2 124 becomes aware of a zoneID associated with BS5 118, MS2 124 determines that BS5 118 does not belong to zone 3. Therefore connection information needs to be updated during the cell reselection or handover performed by MS2 124. In other words, MS2 124 performs cell reselection or handover with BS5 118, while updating its connection information, when the following criteria are met. First, MS2 124 calculates that the signal strength of BS5 118 is above a predetermined threshold. Second, MS2 124 determines that BS5 118 belongs to zone 4, which is different from zone 3, from which MS1 120 is moving. Because of the change in zone, MS2 124 must update its connection information. In this way, MS2 124 performs cell reselection or handover with BS5 118 while also updating its connection information to change from zone 3 106 to zone 4 108.

However, different zones may provide content on different schedules. Thus, when MS2 124 moves among different zones, there may be a gap in content, because of the move. A user of MS2 124 may notice the gap in content 3. For example, if content 3 is a television program, the user of MS2 124 may miss a portion of the television program when MS2 124 moves from zone 3 to zone 4 because of packet loss during the transition.

Figure 2:
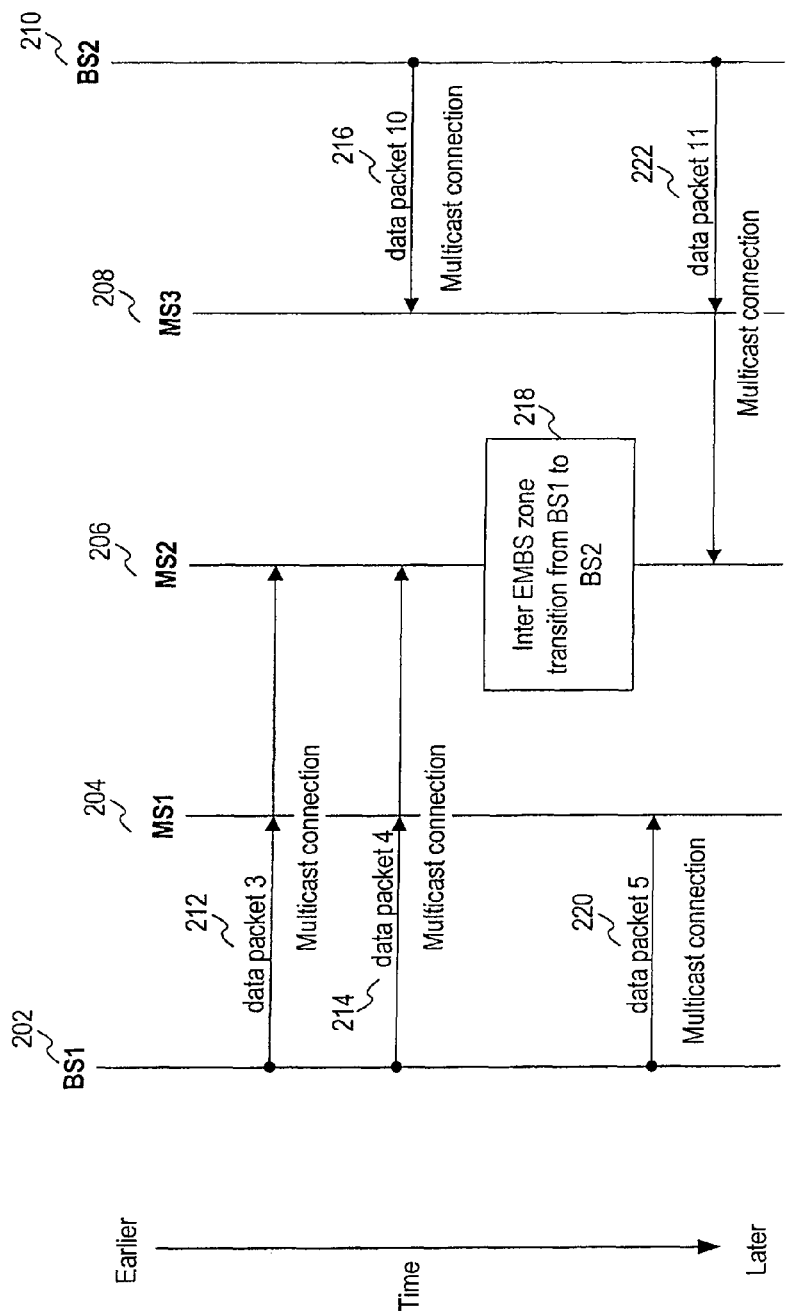
FIG. 2 is a diagram illustrating packet loss during a zone transition of a mobile station.

FIG. 2 is a diagram 200 illustrating packet loss during a zone transition of a mobile station. Diagram 200 includes BS1 202, MS1 204, MS2 206, MS3 208, and BS2 210, each associated with a vertical timeline. The vertical timelines represent a period of time ranging from earlier in time to later in time. Initially, MS1 204 and MS2 206 receive content from BS1 202, while MS3 208 receives the same content from BS2 210. BS1 202 and BS2 210 belong to different zones, and provide the same content at different schedules.

The provided content includes a number of packets, which are broadcasted in a particular order, and which are identified by sequential packet numbers. For example, the provided content may include data packets 1-20, with data packet 1 broadcast at the beginning of the provided content, and data packet 20 broadcast at the end of the provided content.

At 212, BS1 202 sends data packet 3 to MS1 204 and MS2 206 via a multicast connection. Data packet 3 is a packet within the provided content. At 214, BS1 202 sends data packet 4 to MS1 204 and MS2 206 via a multicast connection. Data packet 4 is the next packet, after data packet 3, within the provided content. Moreover, at 216, BS2 210 sends data packet 10 to MS3 208 via a multicast transmission. Data packet 10 is after both data packet 3 and data packet 4, in the content being provided.

BS1 202 broadcasts data packet 4 of the provided content at approximately the same time as BS2 210 broadcasts data packet 10 of the same provided content. For example, if the provided content is a streaming television program, BS1 202 broadcasts an earlier portion of the television show (via data packet number 4) when BS2 210 broadcasts a later portion of the television show (via data packet number 10). Accordingly, because data packet 10 occurs in the provided content after data packet 4, BS2 210 provides the same content ahead of BS1 202.

At block 218, MS2 206 enters an inter MBS zone transition from BS1 202 to BS2 210. In other words, MS2 206 performs cell reselection or handover with BS2 210, which is in a different zone than BS1 202. This cell reselection or handover is similar to the cell reselection or handover performed by MS2 124 in FIG. 1. After the cell reselection or handover, MS2 206 receives the provided content from BS2 210 instead of BS1 202. At 220, BS1 202 sends data packet 5 to MS1 204, but not to MS2 206, because MS2 206 has already transitioned from BS1 202 to BS2 210. Data packet 5 is the next packet, after data packet 4, within the provided content. Next, at 222, BS2 210 sends data packet 11 to MS3 208 and MS2 206. Data packet 11 is the next packet, after data packet 10, within the provided content.

Therefore, MS2 206 receives data packet 4 at 214 and next receives data packet 11 at 222. Data packet 5 through data packet 10 are not received by MS2 206, which represents a gap in the content from the perspective of MS2 206. A user of MS2 206 may notice this service discontinuity, and may miss a portion of the content. It is therefore desirable for MS2 206 to transition to a base station belonging to a different zone while maintaining service continuity.

Figure 3:
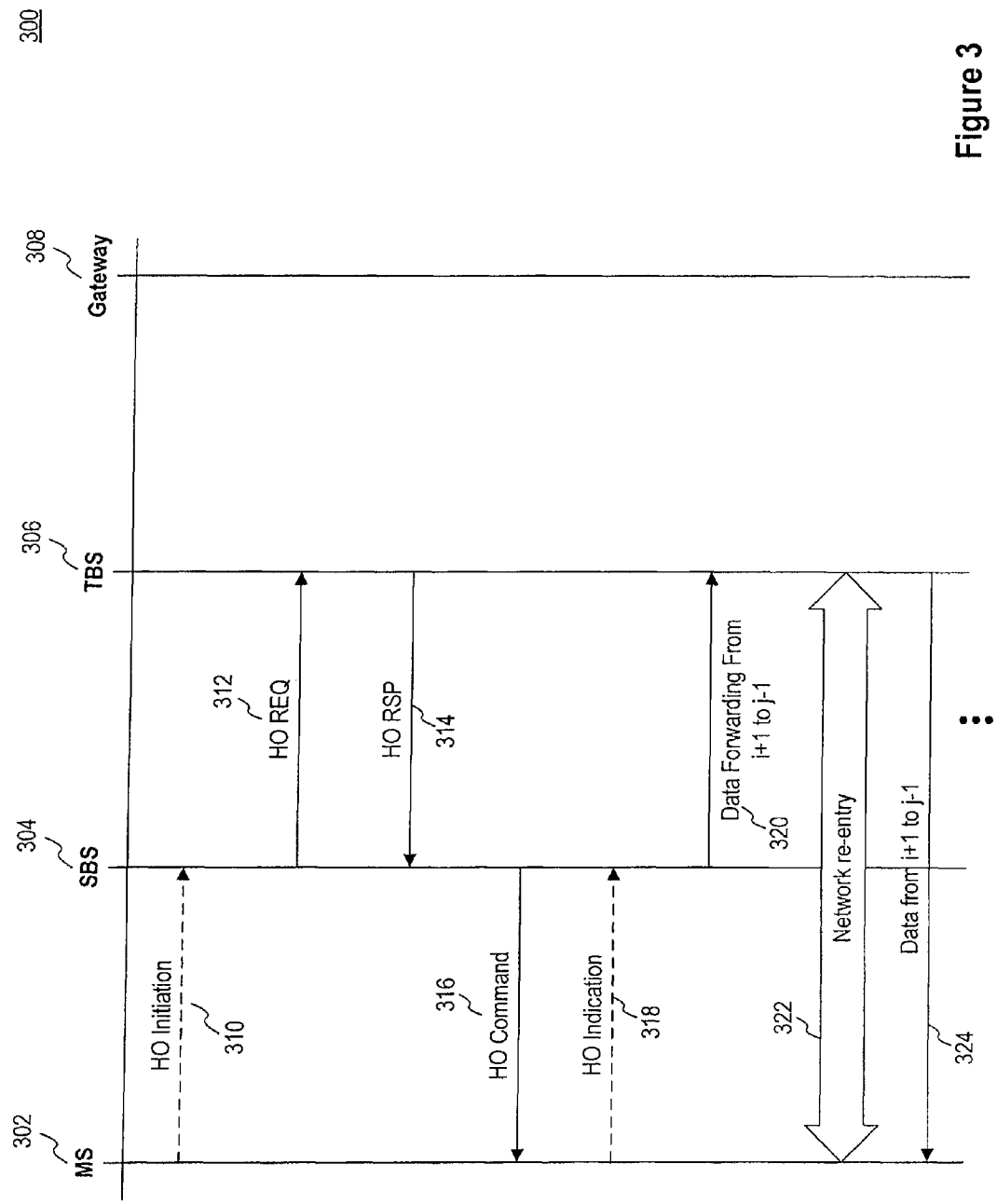
FIG. 3 is a diagram illustrating a communication protocol during a handover when a target base station provides a same service as a serving base station.

FIG. 3 is a diagram 300 illustrating a communication protocol during a handover when a target base station provides a same MBS service as a serving base station. Diagram 300 includes a mobile station (MS) 302, a serving base station (SBS) 304, a target base station (TBS) 306, and a gateway 308. MS 302 operates in a connected state and receives content of the MBS service, such as streaming content, from SBS 304. MS 302 may monitor a signal strength of nearby base stations, such as TBS 306, which belongs to a different zone than SBS 304. Moreover, MS 302 may compile a list of candidate base station(s) having a signal strength above a predetermined threshold. The candidate base station(s) are ones that MS 302 may seek to receive content from, instead of receiving content from SBS 304. MS 302 may compile the list as it moves away from SBS 304 and closer to TBS 306. MS 302 may also send a handover (HO) initiation 310 to SBS 304. HO initiation 310 may include the list of candidate base station(s), including TBS 306. HO initiation 310 is an optional step, and, therefore, is shown as a dotted line. In the alternative, instead of MS 302 determining the candidate base station(s), SBS 304 or gateway 308 may do so.

After receiving the optional HO initiation 310, SBS 304 may send a handover request (HO REQ) 312 to all of the candidate base stations, including TBS 306. HO REQ 312 includes connection information of the MBS service, such as a service identifier (SID), a zoneID, and a last transmitted packet i. The SID is a global identifier of a service, such as the content that SBS 304 is providing to MS 302. Moreover, the zoneID identifies the zone to which SBS 304 belongs, and the last transmitted packet i may identify the last packet of the service, which SBS 304 transmitted to MS 302.

TBS 306 may provide some MBS services, including the service needed by MS 302, to other mobile stations. TBS 306 may save, in a sent buffer, outgoing packets of the services that it provides to the other mobile stations. The packets may be saved in the sent buffer before or after they are sent to the other mobile stations. If it is desired to limit the size of the sent buffer, TBS 306 can delete packets saved in the sent buffer after they reach a predetermined age.

Upon receiving HO REQ 312, TBS 306 may examine the services that it provides, and determine which of those services can support an additional user. This determination may be made by examining the load of the service and/or a number of users currently receiving the service. After determining any available service(s), TBS 306 determines if the service needed by MS 302 for handover, which is identified in HO REQ 312 based on the SID, is one of the available service(s) that TBS 306 can provide. For example, if MS 302 is watching television station CNN while it moves outside a range of SBS 304 and into a range of TBS 306, then TBS 306 determines if it provides CNN, and if it can support an additional user. If TBS 306 determines that it can provide the service needed by MS 302 for handover, then TBS 306 identifies its own zoneID that is associated with the service. TBS 306 also identifies, from HO REQ 312, a zoneID of SBS 304 that is associated with the service. TBS306 then compares the two zoneIDs. In FIG. 3, it is assumed that SBS 304 belongs to a different zone than TBS 306. Because the zoneIDs are different from each other, TBS 306 identifies the oldest packet j in its sent buffer that is associated with the needed service for handover. TBS 306 compares its oldest packet j with the last transmitted packet i of SBS 304. As discussed, last transmitted packet i is identified to TBS 306 from HO REQ 312.

If packet j occurs in the service after packet i, then TBS 306 is ahead in providing the service, as compared to SBS 302. For example, if the service is a television program, packet j may correspond to a data packet that is 5 minutes into the program, whereas packet i may correspond to a data packet that is 2 minutes into the program. In this example, TBS 306 is providing the television program at minute 5, while SBS 304 is providing the same television program at minute 2. Therefore, TBS 306 is ahead of SBS 304 in providing the service. Moreover, because TBS 306 is providing later packets than SBS 304, a handover from SBS 304 to TBS 306 would result in MS 302 not receiving some packets. For example, if MS 302 started receiving the television program from TBS 306 instead of SBS 304, it would be receiving the program after minute 5, even though it had only received up to minute 2 when receiving the television program from SBS 304. In this case, a user of MS 302 would experience a gap in content, i.e., a discontinuity in service, between minute 2 and minute 5. This was the scenario in FIG. 2, in which there was a service discontinuity during handover. Therefore, when packet j occurs in the service later in time than packet i, TBS 306 stops deleting old packets from its sent buffer, such as packet j, that are associated with the needed service for handover. This preserves packets from the service that were not received by MS 302.

By contrast if packet j occurs in the service earlier in time than packet i, there is no need for TBS 306 to maintain old packets in its sent buffer, such as packet j and packets older than packet j, that are associated with the service. This is because MS 302 would have already received packet j and packets older than packet j, from SBS 304, since those packets would have come before packet i, and SBS 304 provided the service to MS 302 up to packet i. However, in FIG. 3, it is assumed that packet j occurs in the service later in time than packet i.

After receiving HO REQ 312, TBS 306 responds by sending a handover response (HO RSP) 314 to SBS 304. HO RSP 314 includes update connection information of the MBS service(s) that is/are requested by MS 302, such as a CID, a zoneID, a Modulation and Coding Scheme (MCS), scheduling information, and a last transmitted packet j. SBS 304 receives HO RSP 314 from TBS 306, and also may receive similar responses from the remaining candidate base station(s). SBS 304 may aggregate information received about candidate base station(s), and sends a handover command (HO Command) 316 to MS 302. HO command 316 includes a list of the candidate base station(s), and their corresponding update connection information. After receiving HO command 316, MS 302 may choose a preferred base station from the listed candidate base stations according to one or more of various criteria. Such criteria may include and are not limited to: signal strength, expected performance of MS 302 at the candidate base stations, loading conditions at the candidate base stations, quality of service requirements of MS 302, and/or MBS service availability. Then, MS 302 sends a handover indication (HO indication) 318 to SBS 304, indicating the preferred base station. In this example, MS 302 chooses TBS 306. However, HO indication 318 is optional, and therefore, is shown as a dotted line. MS 302 may not need to send HO indication 318. For example, HO command 316 may only indicate a single candidate base station, for example, TBS 306. In this case, MS 302 would not have the option of choosing a preferred base station from which to receive service, since only one is available.

As discussed, in FIG. 3, it is assumed that TBS 306 is providing the service ahead of SBS 304, causing MS 302 to potentially miss packets of the service. Therefore, to ensure service continuity, after receiving HO indication 318, SBS 304 sends data forwarding 320 from packet i+1 to packet j−1, to TBS 306, as the missing packets that MS 302 would potentially miss because of the handover. It is assumed that SBS 304 stores, or has access to, packets i+1 to packet j−1.

As discussed, MS 302 may receive packets from SBS 304 for the service, up to packet i. Therefore, the first data forwarding packet that SBS 304 sends to TBS 306 is packet i+1. SBS 304 sends subsequent packets to TBS 306 until packet j−1. This is because SBS 304 is aware that TBS 306 stores packets starting with packet j in its sent buffer. Therefore, packets i+1 to j−1 from data forwarding 320, are packets not received by MS 302, and not possessed by TBS 306.

TBS 306 stores packets i+1 to j−1 identified in data forwarding 320. At some later time, MS 302 seeks network re-entry 322 with TBS 306. MS 302 and TBS 306 synchronize and exchange connection information to enable MS 302 to be able to receive the MBS service from TBS 306. For example, MS 302 updates its connection information to reflect the zoneID of TBS 306, which belongs to a different zone than SBS 304. After the network re-entry 322 is completed, TBS 306 sends packets i+1 to j−1, to MS 302 via unicast 324. TBS 306 may send additional packets of the MBS service to MS 302 via a separate multicast connection. In this way, packets i+1 to j−1, which would have been missed by MS 302, are sent to MS 302, thereby enabling service continuity during handover.

As discussed, in FIG. 3, TBS 306 provides the service that is needed by MS 302 for handover. However, in some cases, TBS 306 does not provide the service needed by 302 for handover.

Figure 4:
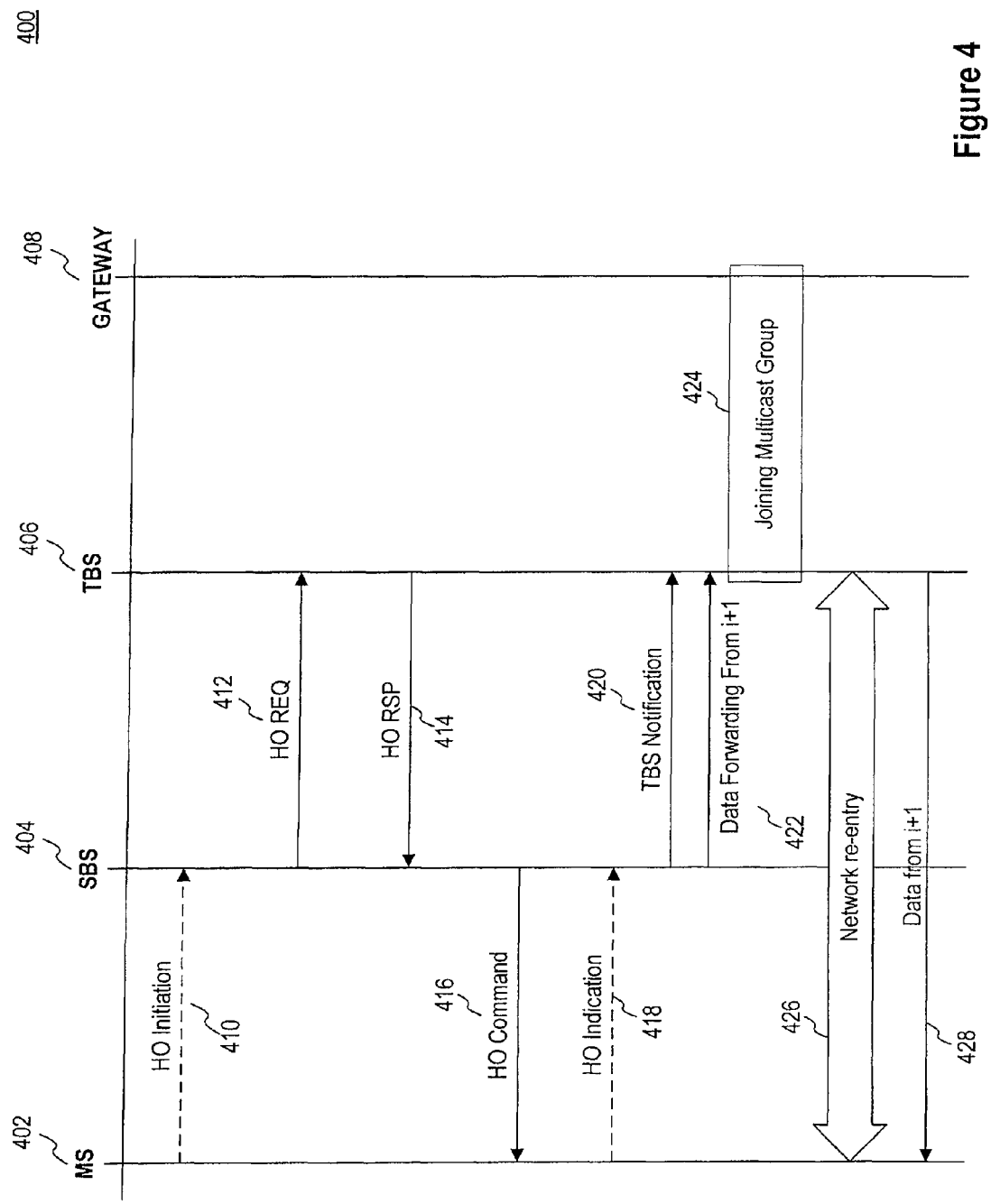
FIG. 4 is a diagram illustrating a communication protocol during a handover when a target base station does not provide a same service as a serving base station.

FIG. 4 is a diagram 400 illustrating a communication protocol during a handover when a target base station does not provide the same services as a serving base station. Items 402-412 of FIG. 4 are similar to items 302-312 of FIG. 3, respectively.

After receiving HO REQ 412, a TBS 406 determines that it does not provide the service that is needed by an MS 402 for handover. TBS 406 then sends an HO RSP 414 to SBS 404 to indicate that the service needed by MS 402 for handover is not available at TBS 406. Unlike HO RSP 314 in FIG. 3, HO RSP 414 does not identify packet j of the service needed by MS 402 for handover, because TBS 406 does not provide the service needed by MS 402 for handover. Therefore, TBS 406 could not have stored packets in its sent buffer associated with the service needed by MS 402 for handover.

Items 416-418 are similar to items 316-318 from FIG. 3, respectively. After receiving HO indication 418, SBS 404 is aware that TBS 406 is selected as the target base station. At this point, SBS 404 is also aware that the service needed by MS 402 for handover is not available yet at TBS 406. To ensure service continuity, SBS 404 sends a TBS notification 420 to TBS 406. TBS notification 420 directs TBS 406 to join the associated multicast group of the service needed by MS 402 for handover. Moreover, SBS 404 sends data forwarding 422 starting from packet i+1 to TBS 406, as the missing packets that MS 402 does not receive because of the handover.

As discussed, MS 402 receives packets from SBS 404 for the service, up to packet i. Therefore, the first data forwarding packet that SBS 404 sends to TBS 406 is packet i+1. MS 402 sends as many packets to TBS 406 as it has stored, because SBS 404 is aware that TBS 406 does not provide the service that is needed by MS 402 for handover and, therefore, does not store any packets for the service in its sent buffer. TBS 406 may send a notification to SBS 404 (not shown) to direct SBS 404 to stop sending the packets when they are no longer needed.

TBS 406 stores packets from data forwarding 422. TBS 406 also communicates a request to gateway 408 for TBS 406 to join a multicast group at block 424. The multicast group is associated with the service needed by MS 402 for handover. After TBS 406 joins the multicast group at block 424, TBS 406 is able to provide the service needed by MS 402 for handover.

MS 402 also seeks network re-entry 426 with TBS 406 at 426, similar to item 322 from FIG. 3. After network re-entry 426 is completed, TBS 406 sends packets starting from i+1 to MS 402 via unicast at 428. In this way, packets after i+1, which would have been missed by MS 402, are sent to MS 402, thereby enabling service continuity during handover.

FIGS. 3 and 4 illustrate communication protocols that are modifications of IEEE 802.16m. However, disclosed embodiments may be implemented according to any other protocols.

Figure 5:
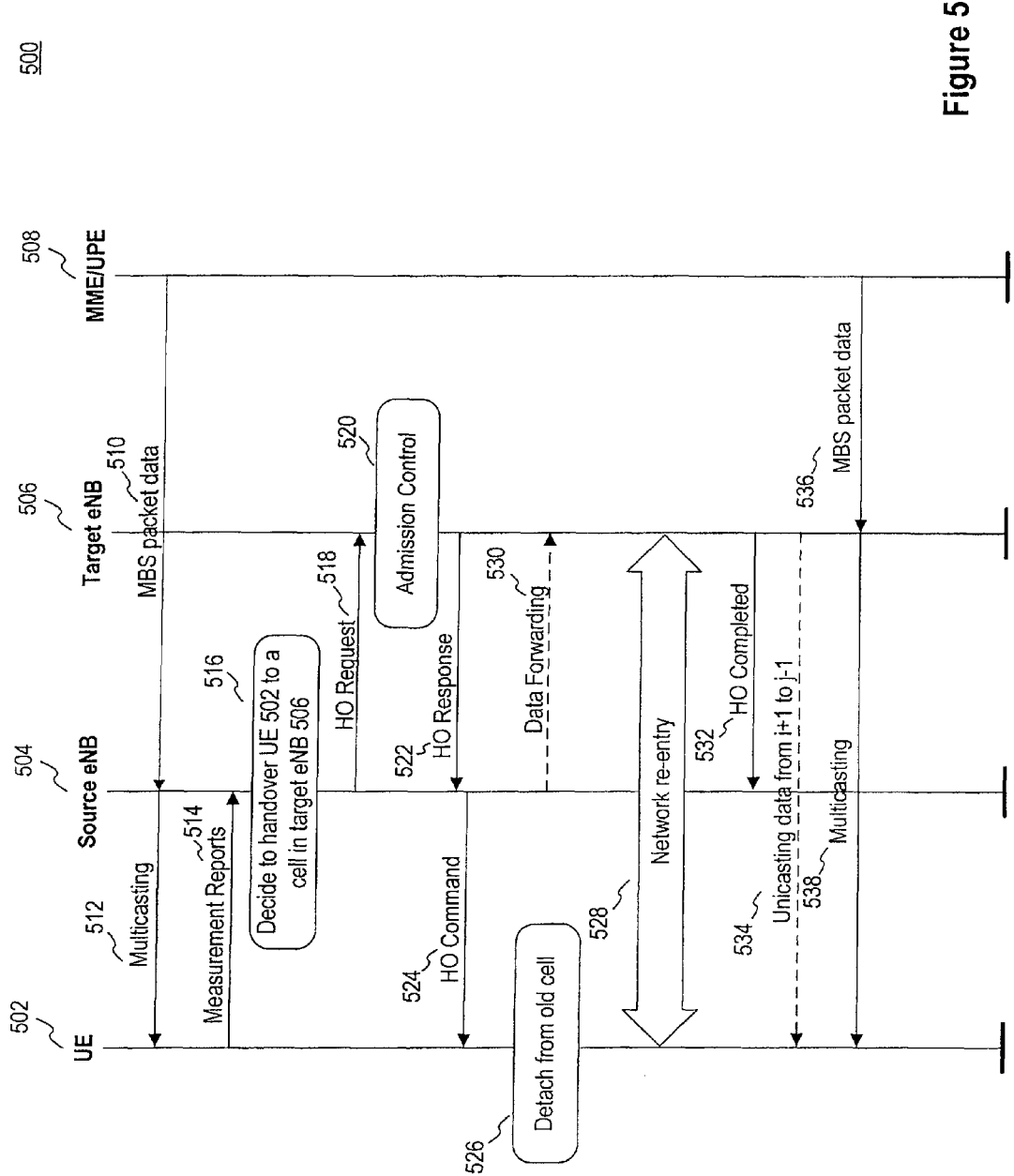
FIG. 5 is a diagram illustrating a communication protocol during a handover according to a modified version of 3rd Generation Partnership Project (3GPP) Long Term Evolution (LTE).

FIG. 5 is a diagram 500 illustrating a communication protocol during a handover according to a modified version of 3rd Generation Partnership Project (3GPP) Long Term Evolution (LTE). In particular, the 3GPP LTE protocol in FIG. 5 has been modified to illustrate and exemplify disclosed embodiments. Diagram 500 includes user entity (UE) 502, a source evolved node B (eNB) 504, a target eNB 506, and a mobility management entity (MME)/user plane entity (UPE) 508. Source eNB 504 provides a MBS service to UE 502. UE 502 operates in the connected state, and may move out of a range of source eNB 504, and into a range of target eNB 506. It is assumed that target eNB 506 provides the same MBS service as source eNB 504, but target eNB 506 belongs to a different zone than source eNB 504.

MME/UPE 508 sends MBS packet data 510 to source eNB 504. MBS packet data 510 is data of the MBS service that source eNB 504 provides to UE 502. Since target eNB 506 provides the same MBS service, MME/UPE 508 also sends MBS packet data to target eNB 506 (not shown). After receiving MBS packet data 510, source eNB 504 multicasts MBS packet data 510, as multicasts 512, to UE 502 according to a predefined schedule. Since UE 502 may move out of a range of source eNB 504, it periodically sends measurement reports 514 to source eNB 504. Measurement reports 514 indicate candidate eNB(s) that UE 502 receives a signal strength from, that is above a predetermined threshold. It is assumed that measurement reports 514 list target eNB 506, because UE 502 receives a signal from target eNB 506 whose strength is above the predetermined threshold.

Next, at block 516, source eNB 504 makes a decision to hand over UE 502 to a cell in target eNB 506. Source eNB 504 makes this decision after finding target eNB 506 in the list of candidate eNBs in measurement reports 514, and choosing target eNB 506 as the most suitable eNB for handover. Source eNB 504 then sends a handover request (HO Request) 518 to target eNB 506. In some embodiments, eNB 504 does not send HO Request 518 to any other eNBs. HO Request 518 includes a service ID that identifies the MBS service provided to UE 502 and a zoneID that identifies the associated zone to which source eNB 504 belongs. HO Request 518 also includes a last packet i of the service, that was transmitted to UE 502 by source eNB 504.

Upon receiving HO Request 518, target eNB 506 then performs admission control 520 for UE 502. In particular, target eNB 506 determines which, if any, of its services are available for an additional user. Target eNB 506 also determines whether the service needed by UE 502 for handover is included in the available services. If the service is included, then target eNB 506 compares the associated zoneID of the service provided by itself with the zoneID identified in handover request 518. In FIG. 5, it is assumed that source eNB 504 belongs to a different zone than target eNB 506. Because the zoneIDs are different from each other, target eNB 506 identifies an earliest packet j that is buffered in its sent buffer for the needed service. If packet j occurs in the service later in time than packet i, then target eNB 506 stops deleting packets associated with the service from its sent buffer.

Target eNB 506 then sends a handover response 522 to source eNB 504. Handover response 522 includes update connection information of the MBS service that target eNB 506 provides. The update connection information may include a CID, a zoneID, an MCS, scheduling information, and/or a last transmitted packet j.

After receiving handover response 522, source eNB 504 sends a handover command 524 to UE 502. Handover command 524 forwards the update connection information received in handover response 522 to UE 502. In this way, UE 502 updates the connection information of the MBS service that it needs for handover to target eNB 506. The updated connection information allows UE 502 to receive the needed services from target eNB 506. Then, at block 526, UE 502 detaches from its old cell associated with source eNB 504. At block 528, UE 502 seeks network re-entry with target eNB 506.

If packet j occurs in the MBS service later in time than packet i, source eNB 504 also sends data forwarding 530 from packet i+1 to packet j-1, to target eBS 506. Data forwarding 530 may be similar to data forwarding 320 and 422 from FIGS. 3 and 4. Because data forwarding 530 only occurs when packet i is later in time than packet j, data forwarding is shown as a dotted line.

Target eNB 506 stores packets i+1 to j-1 identified in data forwarding 530. After UE 502 completes network re-entry 528, target eNB 506 sends a handover completion (HO Completed) 532 to notify source eNB 504 that the handover is complete. Target eNB 506 also sends packets i+1 to j−1 to UE 502 via unicasting 534. Since target eNB 506 provides the same MBS service as source eNB 504, MME/UPE 508 subsequently sends MBS packet data 536 to target eNB 506. After receiving MBS packet data 536, target eNB 506 multicasts MBS packet data 536, as multicasting 538, to UE 502 according to a predefined schedule. In this way, packets i+1 to j−1, which would have been missed by UE 502, are provided by unicast 534, thereby enabling service continuity during handover.

Figure 6:
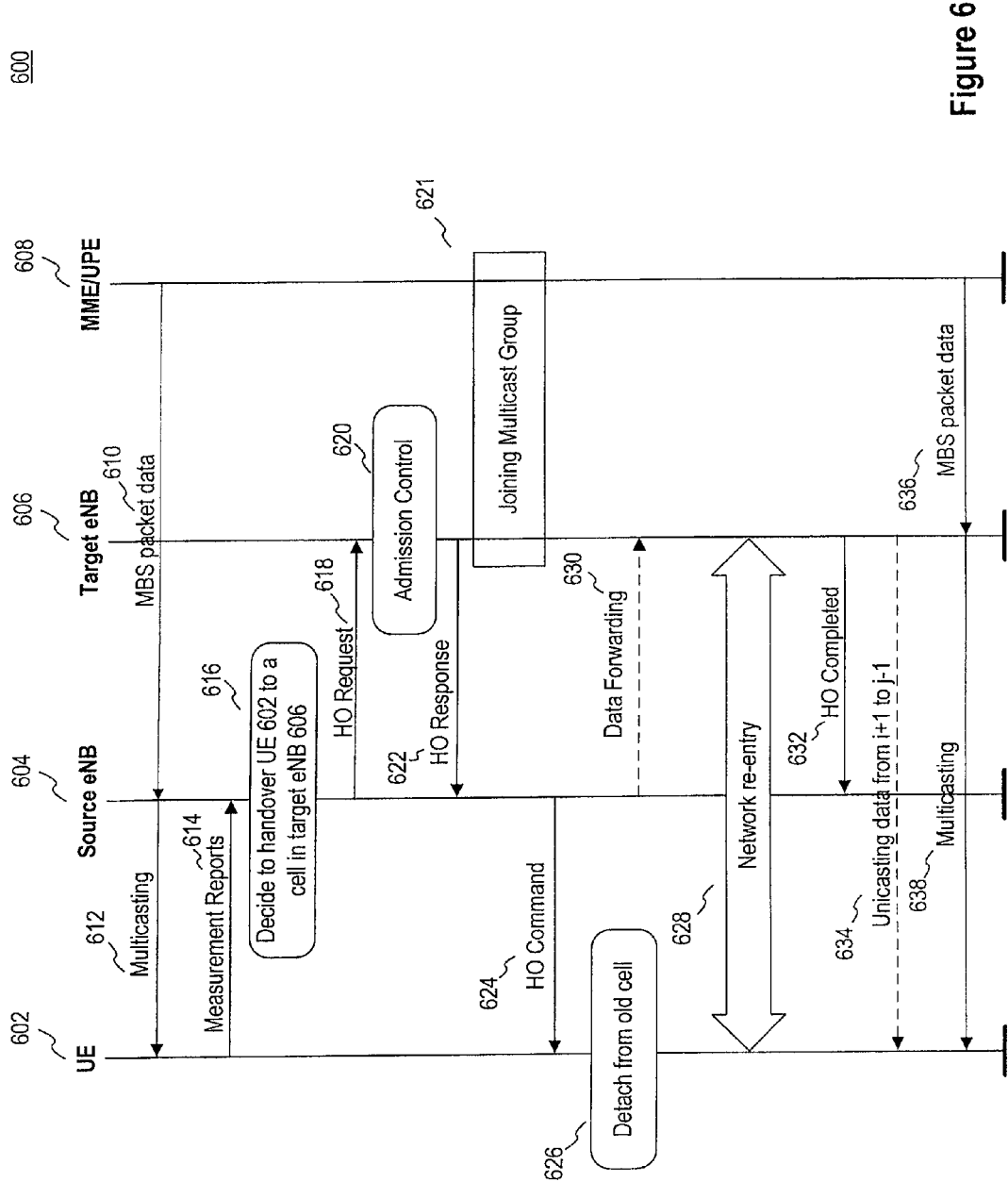
FIG. 6 is a diagram illustrating a communication protocol during a handover according to a modified version of the 3rd Generation Partnership Project (3GPP) Long Term Evolution (LTE).

FIG. 6 is a diagram 600 illustrating a communication protocol during a handover according to a modified version of 3rd Generation Partnership Project (3GPP) Long Term Evolution (LTE). In particular, the 3GPP LTE protocol in FIG. 6 has been modified to illustrate and exemplify disclosed embodiments. Items 602-618 are similar to items 502-518 from FIG. 5. At block 620, target eNB performs admission control and determines that it does not provide the MBS service needed by UE 602. This is different from FIG. 5, in which it was assumed that target eNB 506 did provide the needed MBS service. Therefore, at block 621, target eNB 606 joins the multicast group for the service needed by UE 602. Items 622-638 of FIG. 6 are similar to items 522-538 of FIG. 5.

FIGS. 3-6 related to communication protocols for a mobile station/user entity that operates in a connected state. The protocols illustrated in FIGS. 3-6 have been modified to exemplify disclosed embodiments. In particular, FIGS. 3 and 4 illustrate first communication protocols according to a modified version of IEEE 802.16m, while FIGS. 5 and 6 illustrate second communication protocols according to a modified version of 3GPP LTE. While the modified first and second communication protocols may be similar, there are also differences between them.

One difference is illustrated by the difference between FIG. 4 and FIG. 6. In FIG. 4, the target base station is chosen at either HO Command 416 or HO Indication 418. TBS 406 determines that it has been chosen as the target base station upon receipt of TBS Notification 420. Thereafter, TBS 406 joins the multicast group for the needed service at block 424, because it does otherwise provide the needed service. By contrast, in FIG. 6, the target base station is chosen by source eNB 604 upon receipt of Measurement Reports 614. Target eNB 606 determines that it has been chosen as the target base station upon receipt of HO Request 618. Thereafter, eNB determines that it does not provide the needed service at block 620, and then joins the appropriate multicast group at block 621.

In FIGS. 3-6, when a MS/UE operates in the connected state, the serving BS/source eNB is aware of the MS/UE and is able to assist the MS/UE in updating the MBS connection information. However, disclosed embodiments may also include a MS/UE that is in an idle state.

Figure 7A:
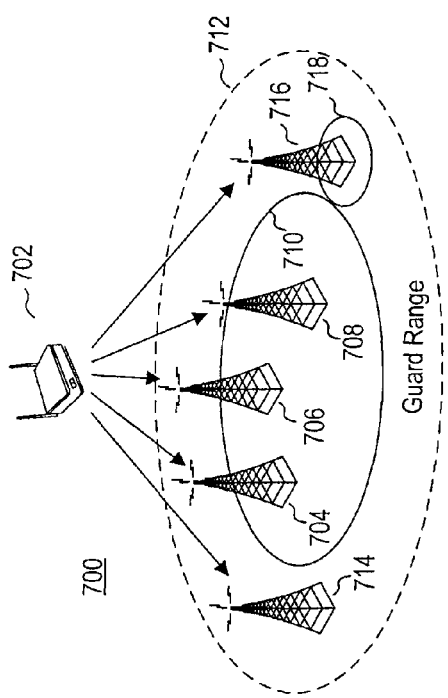
FIG. 7A is a diagram illustrating a wireless communication network using multicast and broadcast services (MBS).

FIG. 7A is a diagram illustrating a wireless communication network 700 using multicast and broadcast services (MBS). Wireless communication network 700 includes two zones managed by a gateway 702.

The first zone includes base stations 704, 706, and 708, which provide a MBS service by using multiple BS access mode over a range 710. Resources used for transmitting the MBS service, such as timing and frequency, are scheduled by gateway 702. Gateway 702 also determines a zoneID for base stations 704-708 providing the MBS service, and also determines a connection identifier (CID) for base stations 704-708 to use for identifying the MBS service.

The area between range 710 and range 712 is a guard range. The guard range is a physical area that is outside of range 710 of base stations operating in multi BS access mode. Gateway 702 prevents base stations inside the guard range from using the same resources when transmitting, in order to avoid co-channel interference. Therefore, gateway 702 shares scheduling information with base stations in range 712. In this example, base stations 714 and 716 are located within the guard range and also receive scheduling information from gateway 702.

The second zone includes base station 716, which provides the same MBS service as base stations 704-708 and 716 using single BS access mode over a range 718. Base station 716 determines the CID identifying the same MBS service provided by base station 716. The resources used for transmitting the same MBS service at base station 716 are also scheduled by base station 716. In order to avoid co-channel interference, base station 716 provides the same service on a different schedule than base stations 704, 706, and 708. Moreover, it is assumed that base station 716 provides the same MBS service at an earlier point than base stations 704, 706, and 708. For example, if the same MBS service is a television program, then at a particular point in real time, base station 716 provides the television program 5 minutes behind the television program provided by base stations 704, 706, and 708.

Figure 7B:
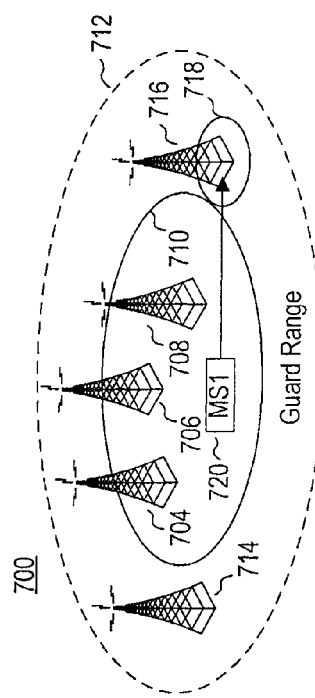
FIG. 7B is a diagram illustrating an idle mobile station moving from a multiple BS access mode to a single BS access mode.

FIG. 7B is a diagram illustrating an idle mobile station moving within network 700 from a multiple BS access mode to a single BS access mode. In particular, FIG. 7B includes a mobile station (MS) 1 720 that moves from the multiple BS access mode in range 710 to the single BS access mode in range 718. Because MS1 720 is in the idle state to conserve battery power, it is beneficial for MS1 720 to remain in the idle state while moving from range 710 to range 718.

Since, gateway 702 provides a CID, zoneID, and timing of the MBS service to all base stations in range 712, base station 716 is aware of the CID and zoneID that base stations 704, 706, and 708 use to provide the service. It is assumed that base station 716 broadcasts a mapping, that maps its own CID with the CID used by base stations 704, 706, and 708. Therefore, MS1 720 can receive this broadcasted mapping, and learn the CID of base station 716, without exiting the idle state. In other words, MS1 720 does not need to enter into a connected state with base station 716 in order to learn the CID for the service that MS1 720 needs to receive after moving to range 718. Moreover, because base station 716 broadcasts the same service at an earlier point than base stations 704, 706, and 708, the packets of the service that base station 716 sends to MS1 720 were already received by MS1 720 when it was located in range 710. Therefore, MS1 720 needs only to discard the redundant packets, and does not miss any part of the service.

Figure 7C:
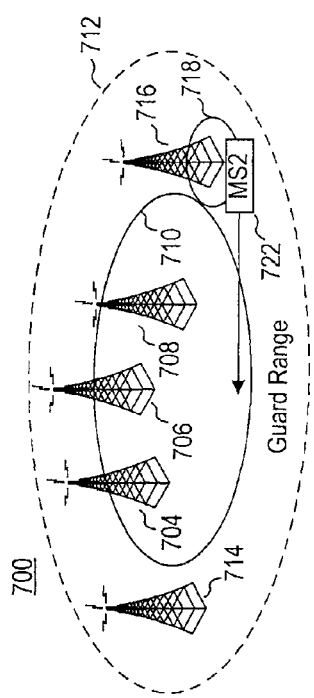
FIG. 7C is a diagram illustrating an idle mobile station moving from a single BS access mode to a multiple BS access mode.

FIG. 7C is a diagram illustrating an idle mobile station moving within network 700 from a single BS access mode to a multiple BS access mode. In particular, FIG. 7C includes a mobile station (MS) 2 722 that moves from the single BS access mode in range 718 to the multiple BS access mode in range 710. Similar to FIG. 7B, because MS2 722 is in the idle state to conserve battery power, it would be beneficial for MS2 722 to remain in the idle state while moving from range 718 to range 710.

Base stations 704, 706, and 708 are unaware of the scheduling of the MBS service provided by base station 716. This means that when MS2 722 moves from range 718 to range 710 while in the idle state, it does not receive a mapping from base stations 704, 706, and 708, such as the mapping described in FIG. 7B. Moreover, as discussed, base stations 704, 706, and 708 provide the same service at a later point than base station 716. Therefore, MS2 722 loses continuity in service when it moves from range 718 to range 710. For example, if base station 716 provides a television program at minute 2, and base stations 704, 706, and 708, provide the television program at minute 5, then MS2 722 would miss the programming between minute 2 and minute 5 when it moves from range 718 to range 710.

Accordingly, MS2 722 transitions from the idle state to the connected state, while receiving the MBS service from base station 716. Once in the connected state, MS2 722 takes part in the handover process outlined previously in FIGS. 3-6 in order to receive the MBS service from base stations 704, 706, and 708 after moving within range 710. This handover process, as previously described, ensures a continuity of service during the handover for a mobile station in the connected state.

Figure 8:
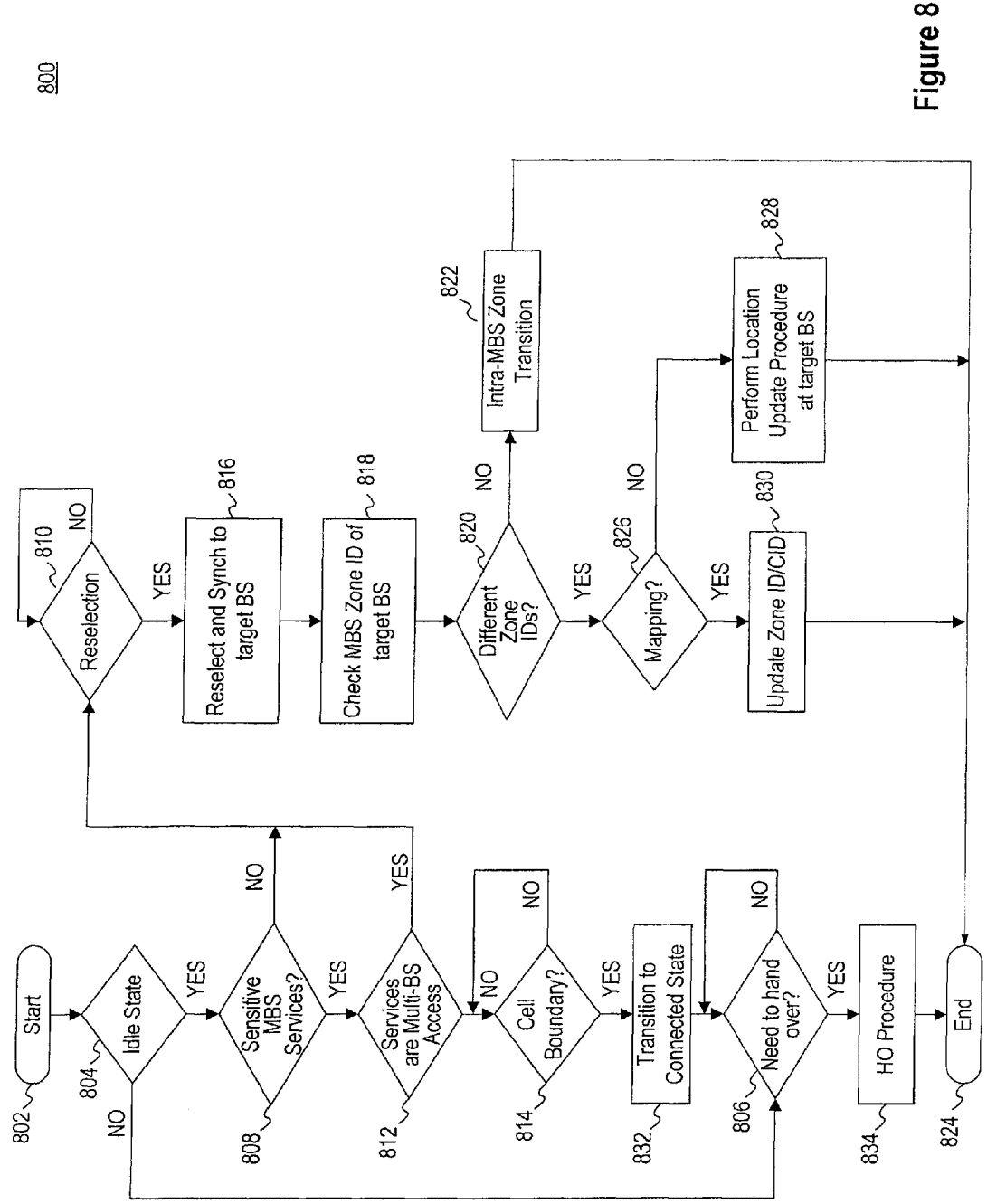
FIG. 8 is a flow diagram illustrating steps taken by a mobile station during a handover.

FIG. 8 is a flow diagram illustrating steps taken by a mobile station during a handover. Flow diagram includes process 800. Process 800 starts at block 802. At block 804, the mobile station determines whether or not it is in an idle state. If the mobile station is not in the idle state (804—NO), then process 800 moves to block 806. If the mobile station is in the idle state (804—YES), then process 800 moves to block 808.

At block 808, the mobile station determines whether or not it is receiving MBS services that are sensitive to packet loss. If the mobile station is not receiving such MBS services (808—NO), then process 800 moves to block 810. If the mobile station is receiving such MBS services (808—YES), then process 800 moves to block 812. At block 812, the mobile station determines whether or not the MBS services that it receives are provided according to multiple BS access mode. If the mobile station is not receiving the MBS services according to multiple BS access mode (812—NO), then process 800 moves to block 814. However, if the mobile station is receiving the MBS services by multiple BS access mode (812—YES), then process 800 moves to block 810.

At block 810, the mobile station determines whether it needs to execute a reselection so that it can receive services from a different base station. As mentioned, process 800 may move to block 810 if the mobile station is not receiving MBS services which are sensitive to packet loss (810—NO). Furthermore, process 800 may instead move to block 810 if the mobile station is receiving MBS services which are sensitive to packet loss, but in multiple BS access mode (812—YES). This is similar to the example from FIG. 7B, in which MS1 720 moves from range 710 to range 718.

If the mobile station does not need to execute a reselection (810—NO), then process 800 loops back to 810. Alternatively, if the mobile station does need to execute a reselection (810—YES), then process 800 moves to block 816. At block 816, the mobile station reselects a target base station and synchronizes with the target base station. Process 800 then moves to block 818

At block 818, the mobile station reads downlink broadcast information of the target base station and checks zoneID(s) of the target base station. Next, at block 820, the mobile station determines if the target BS is associated with a different zone than a base station that was previously serving the mobile station. If the zoneID stored by the mobile station associated with receiving services from the previous base station is not different than the zoneID read from the target base station (820—NO), then process 800 moves to block 822. At block 822, the mobile station determines that the target base station is of a same zone as the previous base station and, therefore, there is no need for the mobile station to update its connection information. This case is similar to the scenario illustrated in FIG. 1, in which MS1 120 made a move 122 from BS1 110 to BS3 114. Accordingly, the process then ends at block 824.

Alternatively, if the zoneID stored by the mobile station associated with receiving services at the previous base station is different than the zoneID read from the target base station (820—YES), then process 800 moves to block 826. At block 826, the mobile station determines if the target base station broadcasts a mapping. In particular, the mapping maps a connection identifier (CID) of the services provided by the target base station, with a CID of the same service provided by the previous base station of the mobile station, before reselection. The target base station received the CID of the previous base station by a gateway device. This case is similar to the scenario illustrated in FIG. 7B, in which base station 716 broadcasts a mapping based on information provided by gateway 702.

If the mobile station does not receive a mapping broadcasted by the target base station (826—NO), then the mobile station transitions to a connected state to perform a conventional location update procedure with the target BS to update its connection information at block 828. After the location update procedure is completed, the mobile station may return to the idle state. Process 800 then ends at block 824. Alternatively, if the mobile station does receive a mapping broadcasted by the target base station (826—YES), then the mobile station updates its zoneID and/or CID at block 830. Process 800 then ends at block 824.

If the mobile station determines that MBS services that it receives, which are sensitive to packet loss, are not received according to multiple BS access (812—NO), then process 800 moves to block 814. This would be the case if the mobile station was receiving the MBS services, for example, in single BS access mode. This case may be similar to the scenario illustrated in FIG. 7C, in which MS2 722 is initially located within a range 718 of base station 716 operating according to a single BS access mode.

At block 814, the mobile station determines whether or not it is near a cell boundary. The mobile station may continuously measure a signal strength of broadcast channels from a serving base station. If the signal strength decreases below a predetermined threshold, the mobile station determines it is near a cell boundary. If the mobile station is not near a cell boundary (814—NO), then process 800 loops back to block 814. Alternatively, if the mobile station is near a cell boundary (814—YES), then the mobile station moves to block 832.

At block 832, the mobile station transitions from the idle state to the connected state. This case may be similar to the scenario illustrated in FIG. 7C, in which MS2 722 moves close to the boundary of range 718 and transitions to the connected state at base station 716 in order to maintain service continuity. Process 800 then moves to block 806.

At block 806, the mobile station determines whether or not it needs to execute a handover so that it can receive services from a different base station. This case is similar to the scenario illustrated in FIG. 3 (or FIG. 4), in which MS 302 (MS 402) sends a HO Initiation 310 (410) to SBS 304 (SBS 404). Alternatively, instead of the mobile station determining whether or not it needs to execute a handover, the serving base station may do so instead. This is similar to the scenario illustrated in FIG. 5 (or FIG. 6), in which UE 502 (UE 602) receives a HO Command 524 (624) from source eNB 504 (source eNB 604). If the mobile station does not need a handover (806—NO), then process 800 loops back to block 806. Alternatively, if the mobile station needs to execute a handover (806—YES), then process 800 moves to block 834.

At block 834, the mobile station executes a handover procedure, similar to that outlined previously in FIGS. 3-6. Process 800 then ends at block 824.

FIG. 8 is exemplary only. As such, steps 802-834 are not limited to the illustrated sequence, some steps may be omitted, and other steps may be added.

Figure 9:
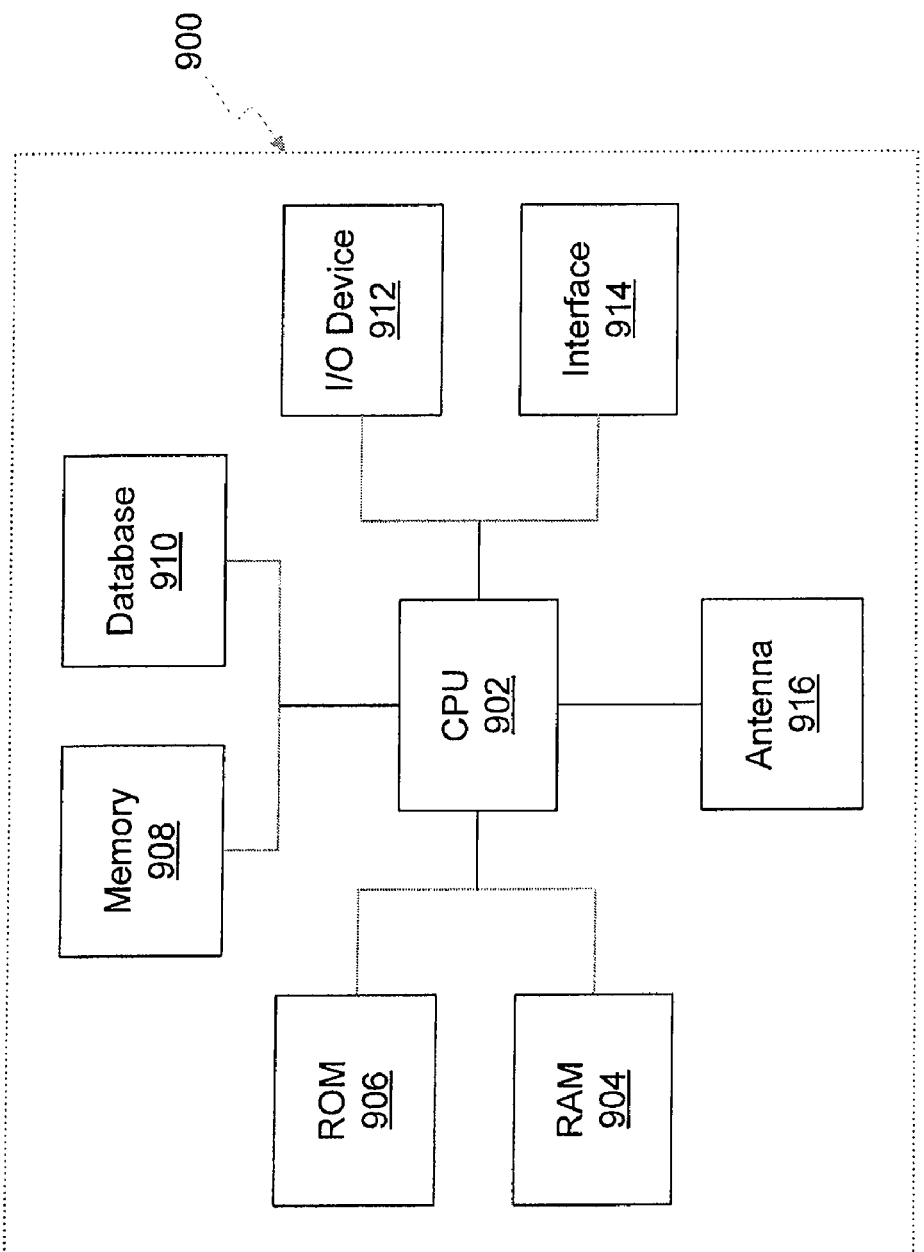
FIG. 9 is a diagram illustrating a host that may be used to implement at least one mobile station, base station, and/or gateway.

FIG. 9 is a diagram illustrating a host 900 that may be used to implement at least one mobile station, base station, and/or gateway. Host 900 may include one or more of the following components: at least one central processing unit (CPU) 902 configured to execute computer program instructions to perform various processes and methods, random access memory (RAM) 904 and read only memory (ROM) 906 configured to access and store information and computer program instructions, memory 908 to store data and information, one or more databases 910 to store tables, lists, or other data structures, one or more I/O devices 912 such as input ports and/or output ports, one or more interfaces 914, and one or more antennas 916. Each of these components is well-known in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of handing over a provided service from a serving base station to a target base station, the service including streaming content sent to a mobile station, the method comprising:
   receiving, at the target base station, a handover request from the serving base station, the handover request identifying
      the streaming content being provided to the mobile station by the serving base station, and
      an interrupt data packet, of the streaming content, last transmitted to the mobile station;
   sending a handover response to the serving base station;
   receiving a notification from the serving base station indicating that the target base station is selected for handover;
   receiving, from the serving base station, subsequent data packets of the streaming content that are later in time than the interrupt data packet;
   sending the received subsequent data packets to the mobile station.

2. The method of claim 1, wherein the streaming content is a first streaming content, and wherein sending the handover response includes identifying a second streaming content provided by the target base station that is available for handover to the mobile station.

3. The method of claim 2, further comprising:
   broadcasting, by the target base station, the second streaming content over a coverage area, wherein the first streaming content and the second streaming content are a same content;
   buffering sent packets of the second streaming content in a sent buffer of the target base station;
   deleting sent packets in the sent buffer that are older than a predetermined age;
   stopping the deleting after receiving the handover request from the serving base station;
   identifying an oldest sent packet of the second streaming content in the sent buffer; and
   referencing the oldest sent packet in the handover response sent to the serving base station, wherein
   the subsequent data packets of the first streaming content received from the serving base station are earlier in time than the oldest sent packet referenced in the handover response.

4. The method of claim 2, wherein the first streaming content is different from the second streaming content, the method further comprising:
   requesting, by the target base station, the first streaming content from a content provider;
   receiving the first streaming content from the content provider; and
   sending streaming packets of the first streaming content, later in time than the subsequent data packets, to the mobile station.

5. The method of claim 1, further comprising:
   sending the received subsequent data packets by unicast; and
   sending streaming packets of the streaming content to the mobile station by multicast and broadcast services (MBS) after sending the subsequent data packets, wherein the streaming packets are later in time than the subsequent data packets.

6. The method of claim 3, further comprising:
   broadcasting the second streaming content according to a single base station transmission mode;
   receiving, from a gateway, a first content identifier of the streaming content provided to the mobile station by the serving base station; and
   broadcasting mapping information that maps the first content identifier with a second content identifier, wherein the second content identifier identifies the second streaming content.

7. A target base station for receiving a handover of a service provided by a serving base station, the service including streaming content sent to a mobile station, the target base station comprising:
   a memory configured to store a handover request received from the serving base station, the handover request identifying
      the streaming content being provided to the mobile station by the serving base station, and
      an interrupt data packet, of the streaming content, last transmitted to the mobile station;
   a processor configured to generate a handover response to send to the serving base station;
   an input port configured to
      receive a notification from the serving base station indicating that the target base station is selected for handover, and
      receive, from the serving base station, subsequent data packets of the streaming content that are later in time than the interrupt data packet; and
   an output port configured to send the received subsequent data packets to the mobile station.

8. The target base station of claim 7, wherein:
   the streaming content is a first streaming content; and
   the processor is further configured to identify, in the handover response, a second streaming content provided by the target base station that is available for handover to the mobile station.

9. The target base station of claim 8, wherein:
   the output port is further configured to broadcast the second streaming content over a coverage area, wherein the first streaming content and the second streaming content are a same content;
   the processor is further configured to:
      buffer sent packets of the second streaming content in a sent buffer of the target base station;
      delete sent packets in the sent buffer that are older than a predetermined age;

stop the deleting after receiving the handover request from the serving base station;
identify an oldest sent packet of the second streaming content in the sent buffer; and
reference the oldest sent packet in the handover response sent to the serving base station;
wherein the subsequent data packets of the first streaming content received from the serving base station are earlier in time than the oldest sent packet referenced in the handover response.

10. The target base station of claim 8, wherein:
the first streaming content is different from the second streaming content;
the processor is further configured to request the first streaming content from a content provider;
the input port is further configured to receive the first streaming content from the content provider; and
the output port is further configured to send streaming packets of the first streaming content, later in time than the subsequent data packets, to the mobile station.

11. The target base station of claim 7, wherein the output port is further configured to:
send the received subsequent data packets by unicast; and
send streaming packets of the streaming content to the mobile station by multicast and broadcast services (MBS) after sending the subsequent data packets, wherein the streaming packets are later in time than the subsequent data packets.

12. The target base station of claim 9, wherein:
the second streaming content is broadcasted according to a single base station transmission mode;
the input port is further configured to receive, from a gateway, a first content identifier of the streaming content provided to the mobile station by the serving base station;
the processor is configured to generate mapping information that maps the first content identifier with a second content identifier, wherein the second content identifier identifies the second streaming content; and
the output port is further configured to broadcast the mapping information.

13. A method of receiving a service during a handover of the service, the method comprising:
receiving, at a mobile station, streaming content from a serving base station in a first format until an interrupt data packet of the streaming content;
receiving a handover command from the serving base station, the handover command identifying a target base station and streaming services provided by the target base station;
receiving subsequent data packets of the streaming content from the target base station in a second format, wherein the subsequent data packets of the streaming content are later in time than the interrupt data packet of the streaming content; and
receiving streaming packets of the streaming content from the target base station in the first format after receiving the subsequent data packets, wherein the streaming packets of the streaming content are later in time than the subsequent data packets of the streaming content.

14. The method of claim 13, further comprising:
reading a signal strength of the target base station; and
sending a handover initiation to the serving base station, reporting the target base station.

15. The method of claim 13, further comprising:
identifying a plurality of target base stations from the received handover command;
choosing the target base station from the plurality of target base stations for handover; and
sending a handover indication to the serving base station, indicating the chosen target base station for handover.

16. The method of claim 13, wherein the received streaming content is first streaming content of a first service, the method further comprising:
receiving, at the mobile station, second streaming content of a second service from a first base station according to a multiple base station transmission mode, when the mobile station is located within a first coverage area of the first base station;
receiving broadcasted mapping information from a second base station mapping a first content identifier with a second content identifier, after the mobile station moves to a second coverage area of the second base station while in an idle state, to receive the service from the second base station,
wherein the first content identifier identifies the second service that is sent by the first base station, and
wherein the second content identifier identifies the second service that is sent by the second base station;
updating a mobile station content identifier according to the mapping information; and
receiving the second service from the second base station according to a single base station transmission mode.

17. The method of claim 13, further comprising:
receiving the streaming content from the serving base station according to a single base station transmission mode, when the mobile station is located within a serving coverage area of the serving base station;
transitioning from the idle state into a connected state, after the mobile station moves to a target coverage area of the target base station while in an idle state; and
receiving streaming packets of the streaming content from the target base station according to a multiple base station transmission mode.

18. The method of claim 13, further comprising:
receiving the streaming content from the serving base station with the first format as multicast and broadcast services (MBS); and
receiving the subsequent data packets of the streaming content from the target base station with the second format as unicast.

19. A mobile station for receiving a service during a handover of the service, the mobile station comprising:
an input port configured to
receive streaming content from a serving base station in a first format until an interrupt data packet of the streaming content, and
receive a handover command from the serving base station, the handover command identifying a target base station and streaming services provided by the target base station; and
a memory configured to
store subsequent data packets of the streaming content received from the target base station in a second format, wherein the subsequent data packets of the streaming content are later in time than the interrupt data packet of the streaming content, and
store streaming packets of the streaming content received from the target base station in the first format, after receiving the subsequent data packets, wherein the streaming packets of the streaming content are later in time than the subsequent data packets of the streaming content.

20. The mobile station of claim 19, further comprising:
a processor configured to analyze a signal strength of the target base station; and
an output port configured to send a handover initiation to the serving base station, reporting the target base station.

21. The mobile station of claim 19, further comprising:
a processor configured to:
identify a plurality of target base stations from the received handover command; and
choose the target base station from the plurality of target base stations for handover; and
an output port configured to send a handover indication to the serving base station, indicating the chosen target base station for handover.

22. The mobile station of claim 19, further comprising a processor, wherein the received streaming content is first streaming content of a first service, further wherein:
the input port is further configured to:
receive, at the mobile station, second streaming content of a second service from a first base station according to a multiple base station transmission mode, while the mobile station is located in a first coverage area of the first base station;
receive broadcasted mapping information from a second base station mapping a first content identifier with a second content identifier, after the mobile station moves to a second coverage area of the second base station, while in an idle state, to receive the service from the second base station, the first content identifier identifying the second service that is sent by the first base station, and the second content identifier identifying the second service that is sent by the second base station; and the processor is further configured to:
update a mobile station content identifier according to the mapping information; and
process the second service received from the second base station according to a single base station transmission mode.

23. The mobile station of claim 19 further comprising a processor, wherein:
the input port is further configured to receive the streaming content from the serving base station according to a single base station transmission mode, when the mobile station is located in a serving coverage area of the serving base station;
the processor is configured to transition from the idle state into a connected state, after the mobile station moves to a target coverage area of the target base station while in the idle state; and
the memory device is further configured to store streaming packets of the streaming content received from the target base station according to a multiple base station transmission mode.

24. The mobile station of claim 19, wherein:
the input port is further configured to receive the streaming content from the serving base station with the first format as multicast and broadcast services (MBS); and
the memory device is further configured to store the subsequent data packets of the streaming content received from the target base station with the second format as unicast.

* * * * *